(12) United States Patent
Savidge et al.

(10) Patent No.: US 11,878,814 B2
(45) Date of Patent: Jan. 23, 2024

(54) AIRSTAIR SYSTEM WITH DEPLOYABLE UPPER STEP

(71) Applicant: BOMBARDIER INC., Dorval (CA)

(72) Inventors: John Richard Savidge, Sooke (CA); Peter Lyver, Beaconsfield (CA); Remi Crozier, Montréal (CA); Patrick Serres, Montréal (CA)

(73) Assignee: BOMBARDIER INC., Dorval (CA)

( * ) Notice: Subject to any disclaimer, the term of this patent is extended or adjusted under 35 U.S.C. 154(b) by 93 days.

(21) Appl. No.: 17/576,135

(22) Filed: Jan. 14, 2022

(65) Prior Publication Data

US 2022/0135227 A1  May 5, 2022

Related U.S. Application Data

(63) Continuation of application No. 16/699,033, filed on Nov. 28, 2019, now Pat. No. 11,254,431.

(60) Provisional application No. 62/774,183, filed on Dec. 1, 2018.

(51) Int. Cl.
*B64D 9/00* (2006.01)
*B64C 1/14* (2006.01)
*B64C 1/24* (2006.01)

(52) U.S. Cl.
CPC .............. *B64D 9/00* (2013.01); *B64C 1/1423* (2013.01); *B64C 1/24* (2013.01)

(58) Field of Classification Search
CPC ............ B64C 1/24; B64C 1/1423; B64D 9/00
See application file for complete search history.

(56) References Cited

U.S. PATENT DOCUMENTS

| | | | |
|---|---|---|---|
| 2,196,546 A * | 4/1940 | Bowers | B64C 1/1415 244/129.5 |
| 3,213,962 A | 10/1965 | Clark | |
| 4,176,812 A * | 12/1979 | Baker | B64C 1/1407 244/129.5 |
| 7,669,797 B2 | 3/2010 | Yada et al. | |
| 7,677,494 B2 | 3/2010 | Yada et al. | |
| 8,157,215 B2 | 4/2012 | Yada et al. | |
| 8,196,865 B2 | 6/2012 | Martin | |
| 9,033,277 B2 | 5/2015 | Berthoud | |
| 2007/0045472 A1 | 3/2007 | Erben et al. | |

(Continued)

OTHER PUBLICATIONS

European Patent Office, Communication and Extended European Search Report re: application No. 19211400.7 dated Apr. 14, 2020.

*Primary Examiner* — Joshua J Michener
*Assistant Examiner* — Ka Chun Leung
(74) *Attorney, Agent, or Firm* — Norton Rose Fulbright Canada LLP

(57) ABSTRACT

Airstair systems and associated methods are disclosed. In one embodiment, the airstair has a deployable upper step, a primary deployment device and a secondary deployment device. The upper step is movable between a stowed configuration when a door of the aircraft is closed and a deployed configuration when the door is open. The primary deployment device resiliently biases the upper step toward the deployed configuration. The secondary deployment device is movable in coordination with a movement of the door and configured to drive the deployable upper step toward the deployed configuration during opening of the door and during a failure of the primary deployment device.

6 Claims, 13 Drawing Sheets

(56) References Cited

U.S. PATENT DOCUMENTS

2007/0283512 A1    12/2007   Yada
2008/0099605 A1     5/2008   Yada et al.
2009/0078827 A1     3/2009   Martin
2018/0127082 A1*   5/2018   Barmichev ............... B64C 1/24
2020/0317320 A1   10/2020   Gormley

* cited by examiner

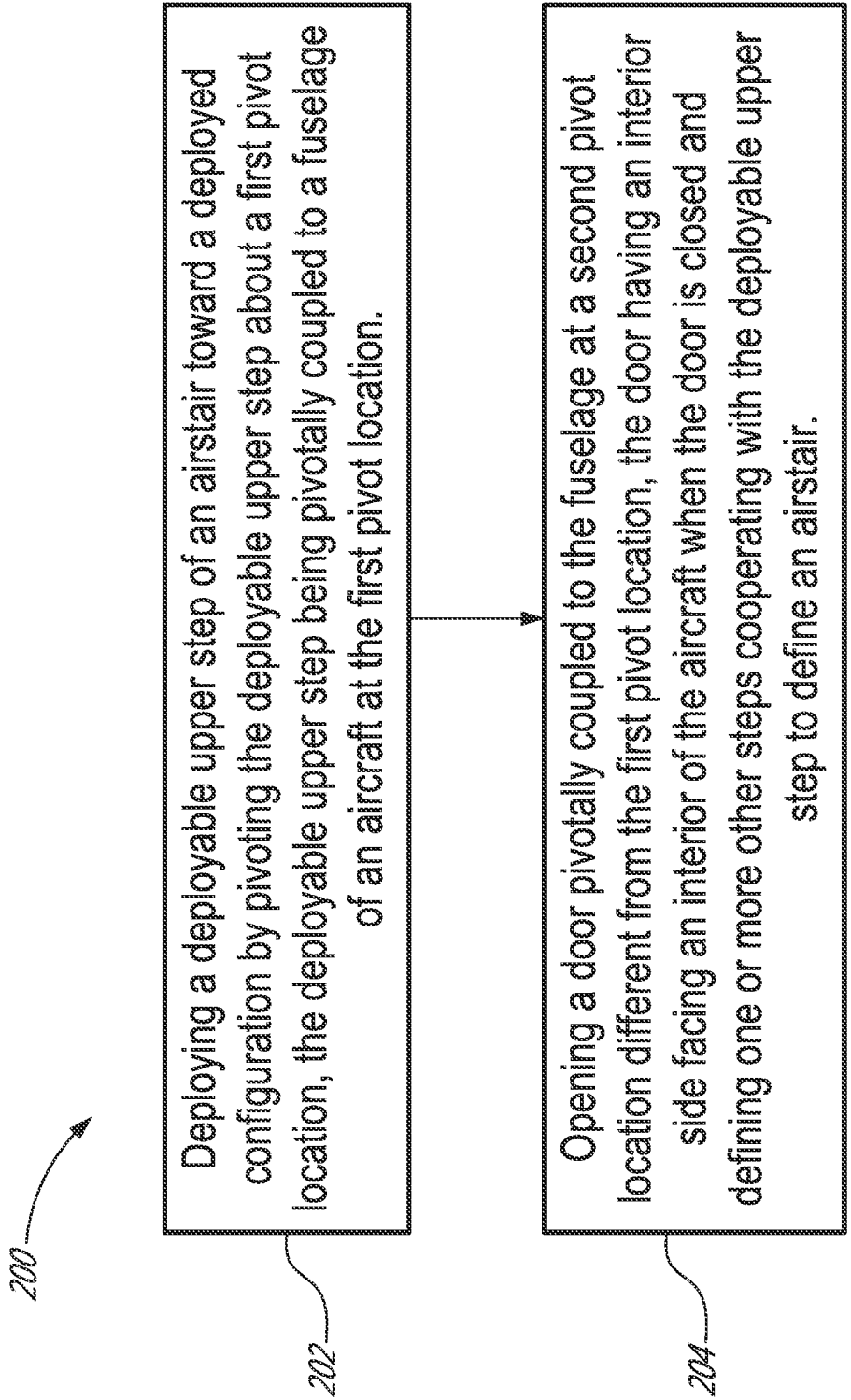

AIRSTAIR SYSTEM WITH DEPLOYABLE UPPER STEP

CROSS REFERENCE TO RELATED APPLICATIONS AND CLAIM OF PRIORITY

This application is a continuation of U.S. patent application Ser. No. 16/699,033 filed on Nov. 28, 2019 and incorporated herein by reference, which claims priority to U.S. Provisional Patent Application Ser. No. 62/774,183 filed on Dec. 1, 2018, the entire contents of which are hereby incorporated by reference.

TECHNICAL FIELD

The disclosure relates generally to aircraft, and more particularly to an airstair of an aircraft.

BACKGROUND

Some aircraft have a built-in set of stairs called an "airstair" that permits passengers to board and exit the aircraft. An airstair can be built into an interior side of a clamshell-style door of the aircraft. An airstair can eliminate the need for passengers to use a mobile stairway or jet bridge to board or exit the aircraft. Some airstairs can comprise one or more deployable steps. However, existing mechanisms for deploying such steps can be relatively complex. Improvement is desirable.

SUMMARY

In one aspect, the disclosure describes an airstair system for an aircraft. The system comprises:
  a deployable upper step movable between a stowed configuration when a door of the aircraft is closed and a deployed configuration when the door is open;
  a primary deployment device resiliently biasing the deployable upper step toward the deployed configuration; and
  a secondary deployment device movable in coordination with a movement of the door and configured to drive the deployable upper step toward the deployed configuration during opening of the door and during a failure of the primary deployment device.

The primary deployment device may comprise a spring.

The primary deployment device may resiliently bias the upper step toward the deployed configuration irrespective of the movement of the door.

The deployable upper step may be pivotally coupled to a fuselage of the aircraft at a pivot location that is different from a pivot location at which the door is pivotally coupled to the fuselage.

The deployable upper step may be pivotable about a rotation axis. The primary deployment device may comprise a coil spring disposed coaxially with the rotation axis.

The system may comprise a hinge pivotally coupling the door to the fuselage of the aircraft. The deployable upper step may interface with the hinge when the deployable upper step is in the deployed configuration.

The hinge may define an upper stepping surface. The deployable upper step may extend the upper stepping surface defined by the hinge when the deployable upper step is in the deployed configuration.

The secondary deployment device may comprise a command lever pivotally coupled to the fuselage of the aircraft and drivingly coupled for coordinated movement with the movement of the door.

The secondary deployment device may comprise a first engaging member. The deployable upper step may comprise a second engaging member for engaging with the first engaging member.

The second engaging member may be movable relative to the deployable upper step between a ceding position allowing the first engaging member to move past the second engaging member, and a interfering position interfering with movement of the first engaging member. The second engaging member may be resiliently biased toward the interfering position.

The first engaging member may move the second engaging member toward the ceding position during a closing movement of the door. The first engaging member may drivingly engage the deployable upper step via the second engaging member during an opening movement of the door.

The second engaging member may be pivotally coupled to the deployable upper step and may be resiliently biased against a hard stop defining the interfering position of the second engaging member.

The system may comprise a hinge pivotally coupling the door to the fuselage of the aircraft. The secondary deployment device may comprise:
  a command lever pivotally coupled to the fuselage; and
  a link having a first end pivotally coupled to the command lever and an opposite second end pivotally coupled to the hinge.

The command lever of the secondary deployment device may comprise a first engaging member. The deployable upper step may comprise a second engaging member for engaging with the first engaging member.

The secondary deployment device may drive the deployable upper step toward the stowed configuration during closing of the door.

The deployable upper step may be pivotally coupled to the fuselage of the aircraft.

The secondary deployment device may be configured to pull the deployable upper step toward the deployed configuration.

Embodiments can include combinations of the above features.

In another aspect, the disclosure describes a method for actuating a deployable upper step of an airstair of an aircraft. The method comprises:
  using a primary deployment device, resiliently biasing the deployable upper step toward a deployed configuration during opening of a door of the aircraft; and
  using a secondary deployment device movable in coordination with a movement of the door, driving the deployable upper step toward the deployed configuration during opening of the door and during a failure of the primary deployment device.

The method may comprise resiliently biasing the upper step toward the deployed configuration irrespective of the movement of the door.

The deployable upper step may be pivotable about a rotation axis different from a rotation axis of the door.

The method may comprise using the secondary deployment device to drive the deployable upper step toward the stowed configuration during closing of the door.

The deployable upper step may be pivotally coupled to the fuselage of the aircraft.

The method may comprise using the secondary deployment device to pull the deployable upper step toward the deployed configuration.

Embodiments can include combinations of the above features.

In another aspect, the disclosure describes an airstair system for an aircraft. The system comprises:
- a deployable upper step movable between a stowed configuration and a deployed configuration, the deployable upper step being pivotally coupled to a fuselage of the aircraft at a first pivot location; and
- a door pivotally coupled to the fuselage at a second pivot location different from the first pivot location, the door having an interior side facing an interior of the aircraft when the door is closed and defining one or more other steps cooperating with the deployable upper step to define an airstair.

The system may comprise a hinge pivotally coupling the door to the fuselage. The deployable upper step interfaces with the hinge when the deployable upper step is in the deployed configuration.

The hinge may define an upper stepping surface. The deployable upper step may extend the upper stepping surface defined by the hinge when the deployable upper step is in the deployed configuration.

The upper step is resiliently biased toward the deployed configuration irrespective of a position of the door.

The system may comprise a device movable in coordination with a movement of the door and configured to drive the deployable upper step toward the stowed configuration during closing of the door.

Embodiments can include combinations of the above features.

In another aspect, the disclosure describes a method for actuating a deployable upper step of an airstair of an aircraft. The method comprises:
- deploying the deployable upper step of the airstair toward a deployed configuration by pivoting the deployable upper step about a first pivot location, the deployable upper step being pivotally coupled to a fuselage of the aircraft at the first pivot location; and
- opening a door pivotally coupled to the fuselage at a second pivot location different from the first pivot location, the door having an interior side facing an interior of the aircraft when the door is closed and defining one or more other steps cooperating with the deployable upper step to define an airstair.

The door may be pivotally coupled to the fuselage via a hinge. The method may comprise causing the deployable upper step to interface with the hinge when the deployable upper step is in the deployed configuration.

The hinge may define an upper stepping surface. The method may comprises using the deployable upper step to extend the upper stepping surface defined by the hinge when the deployable upper step is in the deployed configuration.

The method may comprise resiliently biasing the upper step toward the deployed configuration irrespective of a position of the door.

The method may comprise driving the deployable upper step toward the stowed configuration during closing of the door.

Embodiments can include combinations of the above features.

In a further aspect, the disclosure describes an aircraft comprising the airstair system as described herein.

Further details of these and other aspects of the subject matter of this application will be apparent from the detailed description included below and the drawings.

DESCRIPTION OF THE DRAWINGS

Reference is now made to the accompanying drawings, in which:

FIG. 13 is a flowchart of another method for actuating a deployable upper step of an airstair.

DETAILED DESCRIPTION

In various embodiments, the airstair systems and associated methods described herein can facilitate the deployment and stowing of one or more deployable upper steps of an airstair of an aircraft. The systems disclosed herein can permit a deployment and stowing of the upper step that is coordinated (e.g., synchronized) with the opening and closing of the door. In some embodiments, the systems disclosed herein can have a relatively simple construction compared to other existing systems and can also facilitate maintenance of the airstair by permitting manual lifting of the upper step to provide access under the upper step without requiring (e.g., significant or any) disassembly of the upper step or other part(s) of the airstair. The deployable upper step disclosed herein can provide a relatively stable and large stepping surface for passengers and can have an aesthetically pleasing and clean appearance.

In various embodiments, the airstair system described herein comprises a primary deployment device (e.g., spring (s)) that resiliently biases the deployable upper step toward the deployed configuration. The airstair can also comprise a secondary deployment device movable in coordination with a movement of the door of the aircraft and that is configured to drive (e.g., pull) the deployable upper step toward the deployed configuration during opening of the door in the event of a failure of the primary deployment device. Aspects of various embodiments are described through reference to the drawings.

Figure 1:
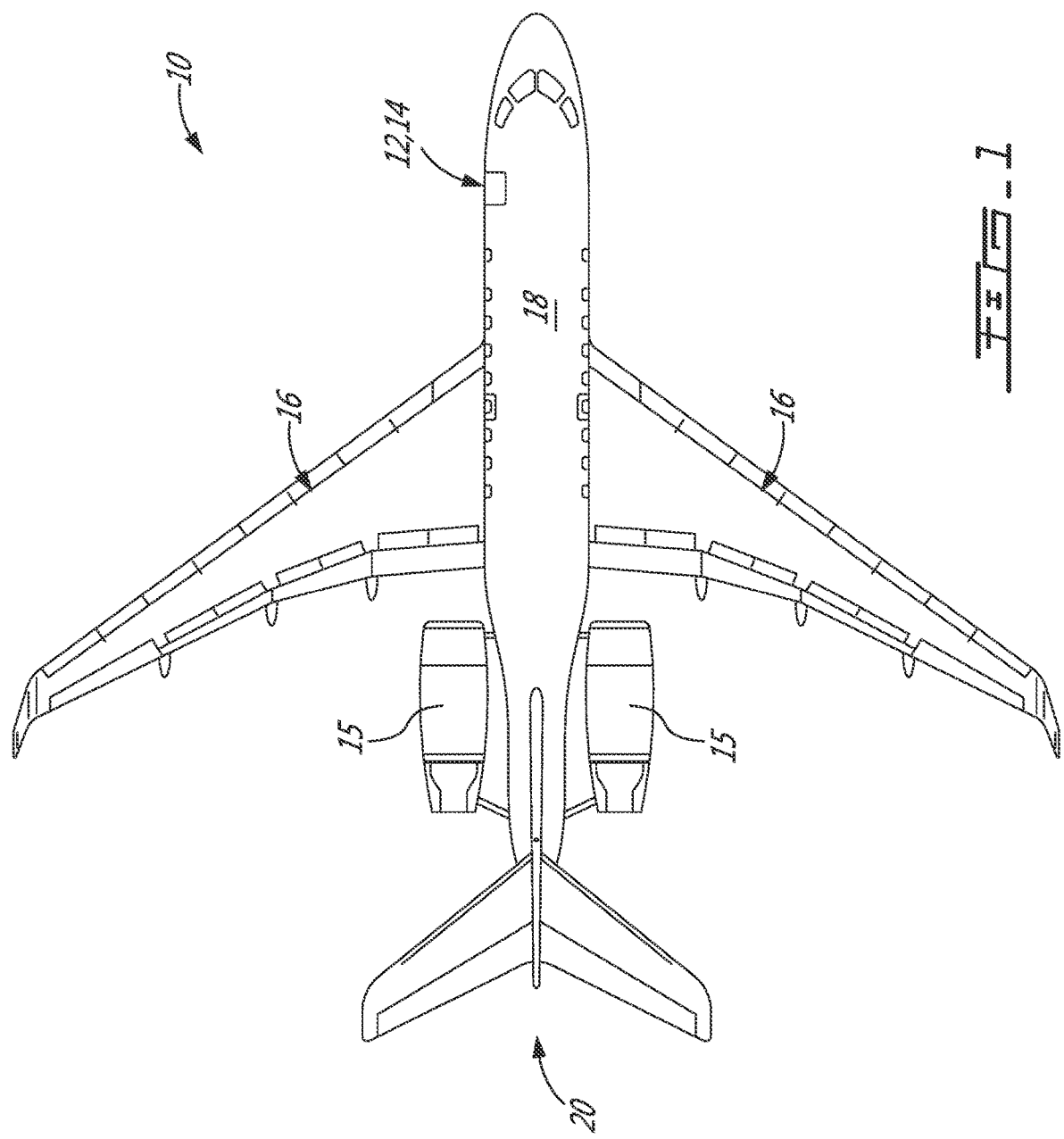
FIG. 1 is a top plan view of an exemplary aircraft comprising an airstair system as described herein.

FIG. 1 is a top plan view of an exemplary aircraft 10 which can comprise door 12 and airstair system 14 as described herein. Aircraft 10 can be a fixed-wing aircraft comprising one or more engines 15. Aircraft 10 can comprise wings 16, fuselage 18 and empennage 20. Aircraft 10 can be any type of aircraft such as corporate, private, commercial and passenger aircraft suitable for civil aviation. For example, aircraft 10 can be a (e.g., ultra-long range) business jet, a twin-engine turboprop airliner or a regional jet airliner.

Figure 2:
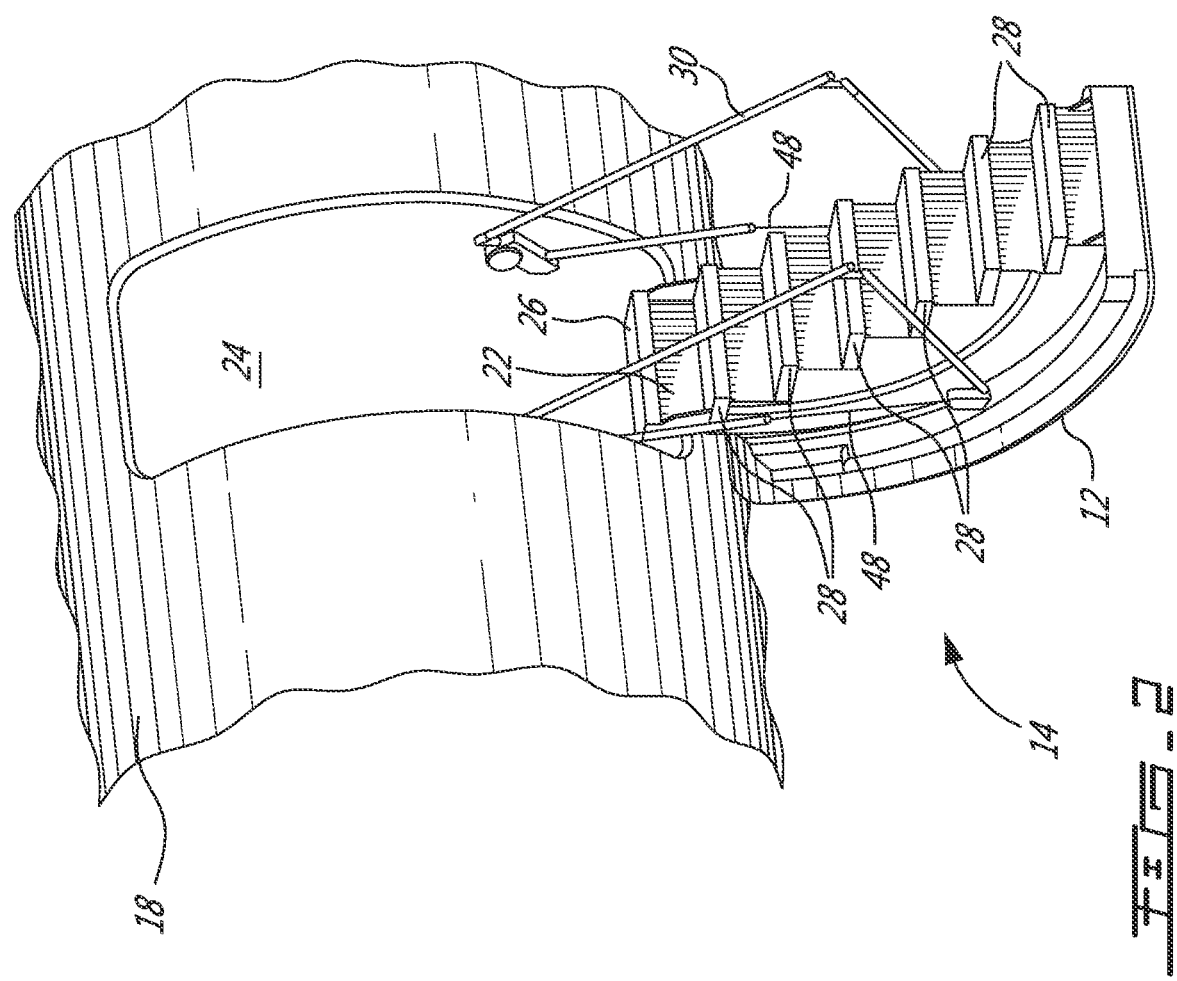
FIG. 2 is a perspective view of a portion of a fuselage of the aircraft of FIG. 1 with an exemplary airstair system.

FIG. 2 is a perspective view of a portion of fuselage 18 with door 12 of aircraft 10 shown in an open position. Door 12 can be a clamshell-style door. Airstair system 14 can be integrated with door 12. Door 12 can be pivotally coupled to fuselage 18 of aircraft 10 via hinge 22 disposed at a lower portion of opening 24 formed into fuselage 18. Door 12 can have an interior side facing an interior (e.g., passenger cabin) of aircraft 10 when door 12 is closed and an exterior side (e.g., outer skin) facing an exterior of aircraft 10 when door 12 is closed. The interior side of door 12 can define an airstair that is part of airstair system 14 and permit passengers to board and exit aircraft 10 when door 12 is open. Airstair system 14 can comprise deployable upper step 26 movable between a stowed configuration when door 12 is closed and a deployed configuration when door 12 is open. Airstair system 14 can comprise one or more fixed (i.e., non-deployable) steps 28 that are disposed below deployable upper step 26 on airstair system 14 when door 12 is open. Airstair system 14 can also include deployable handrail 30. Handrail 30 can be movable between a stowed configuration when door 12 is closed to a deployed configuration when door 12 is open.

Figure 3:
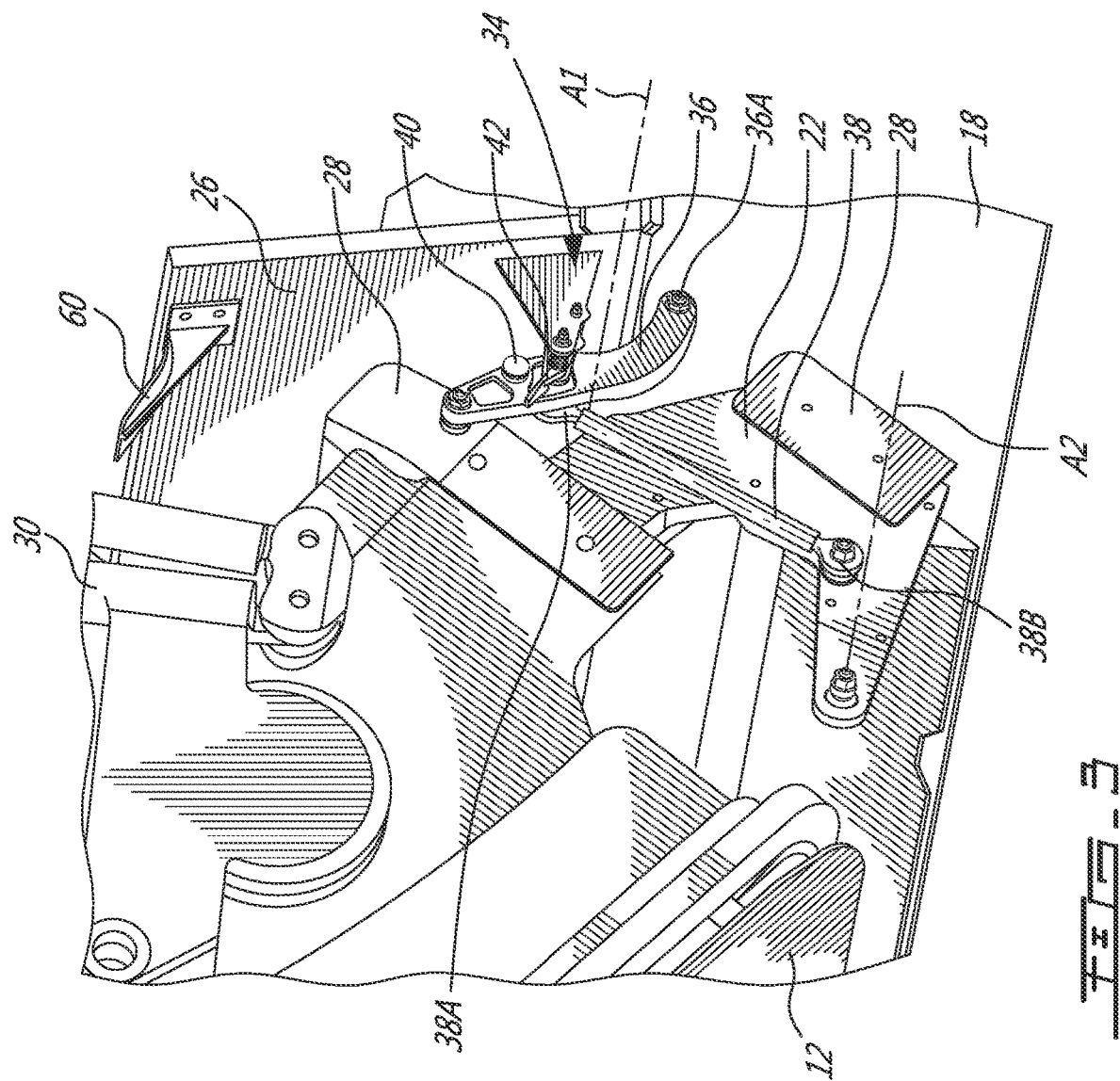
FIG. 3 is a perspective view of an upper portion of the airstair of FIG. 2 showing an exemplary deployable upper step.

FIG. 3 is a perspective view of an upper portion of airstair system 14 showing an exemplary deployable upper step 26. Upper step 26 can comprise a single panel that is pivotally coupled to part of fuselage 18 (i.e., main body) of aircraft 10. Upper step 26 can be pivotally coupled to fuselage 18 at a pivot location that is different from a pivot location at which door 12 is pivotally coupled to fuselage 18 via hinge 22. Accordingly, upper step 26 can be rotatable about rotation axis A1 that is different from rotation axis A2 of door 12. Rotation axis A1 of upper step 26 can be parallel but spaced apart from rotation axis A2 of door 12.

Deployable upper step 26 can be movable between a stowed configuration as shown in FIG. 3 when door 12 is closed and a deployed configuration (see FIG. 8) when door 12 is open. Airstair system 14 can comprise primary deployment device 32 (shown in FIG. 4) resiliently biasing upper step 26 toward the deployed configuration. Airstair system 14 can also comprise mechanism 34 shown in FIGS. 6-8 and movable in coordination with a movement of door 12. Mechanism 34 can serve as a secondary deployment device for driving upper step 26 toward the deployed configuration during opening of door 12 in the event of a failure of primary deployment device 32. Mechanism 34 can also be configured to drive upper step 26 toward the stowed configuration during closing of door 12.

Mechanism 34 can comprise command lever 36 having a first end 36A that is pivotally coupled to fuselage 18. Mechanism 34 can also comprise link 38 having first end 38A pivotally coupled to command lever 36 and an opposite second end 38B pivotally coupled to hinge 22. Command lever 36 of mechanism 34 can comprises first engaging member 40. First engaging member 40 can be a boss or a roller protruding from a side of command lever 36. Upper step 26 can comprise second engaging member 42 for engagement with first engaging member 40. As explained further below, the engagement of first engaging member 40 with second engaging member 42 can permit mechanism 34 to pull upper step 26 toward the deployed configuration.

Figure 4:
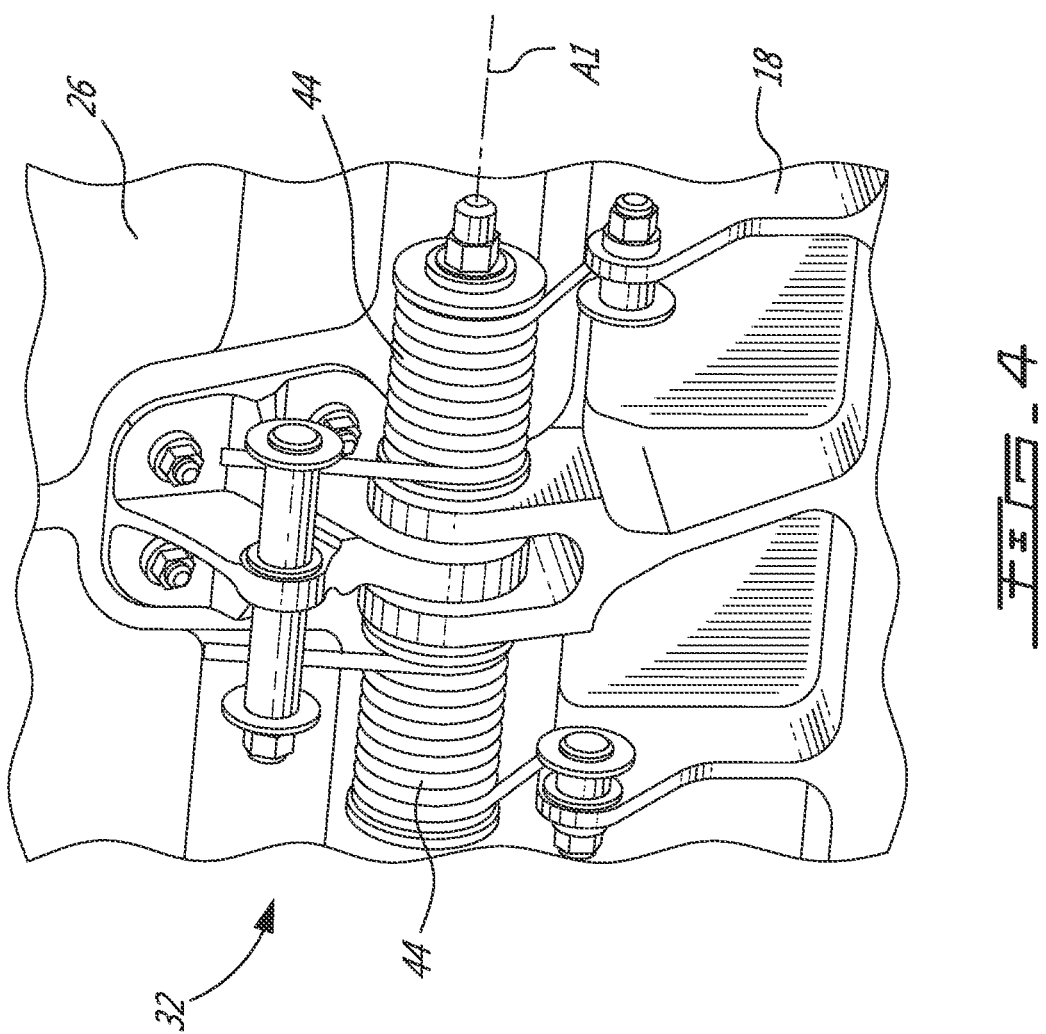
FIG. 4 is a perspective view of a spring resiliently biasing the deployable upper step of FIG. 3 toward a deployed configuration.

FIG. 4 is a perspective view of primary deployment device 32 resiliently biasing deployable upper step 26 toward the deployed configuration. In some embodiments, primary deployment device 32 can comprise one or more springs 44. In some embodiments, such springs 44 can be torsion (e.g., coil) springs that are disposed coaxially with rotation axis A1 of upper step 26. Spring(s) 44 can be disposed at a hinge/pivot location between upper step 26 and fuselage 18. Spring(s) 44 can be disposed at a coupling location of upper step 26 and fuselage 18.

Spring(s) 44 can be configured to apply a torque between upper step 26 and fuselage 18 in order to resiliently bias upper step 26 toward the deployed configuration. In some embodiments, spring(s) 44 can be configured to resiliently bias upper step 26 toward the deployed configuration irrespectively of the movement or position of door 12. For example, spring(s) 44 can be configured to resiliently bias upper step 26 toward the deployed configuration when door 12 is closed, when door 12 is open, when door 12 is undergoing a closing movement and/or when door 12 is undergoing an opening movement. Airstair system 14 can comprise one primary deployment device 32 or a plurality of primary deployment devices 32 disposed at different locations along rotation axis A1 for example. Other types (e.g., linear) springs could be used to resiliently bias upper step 26 toward the deployed configuration.

Figure 5:
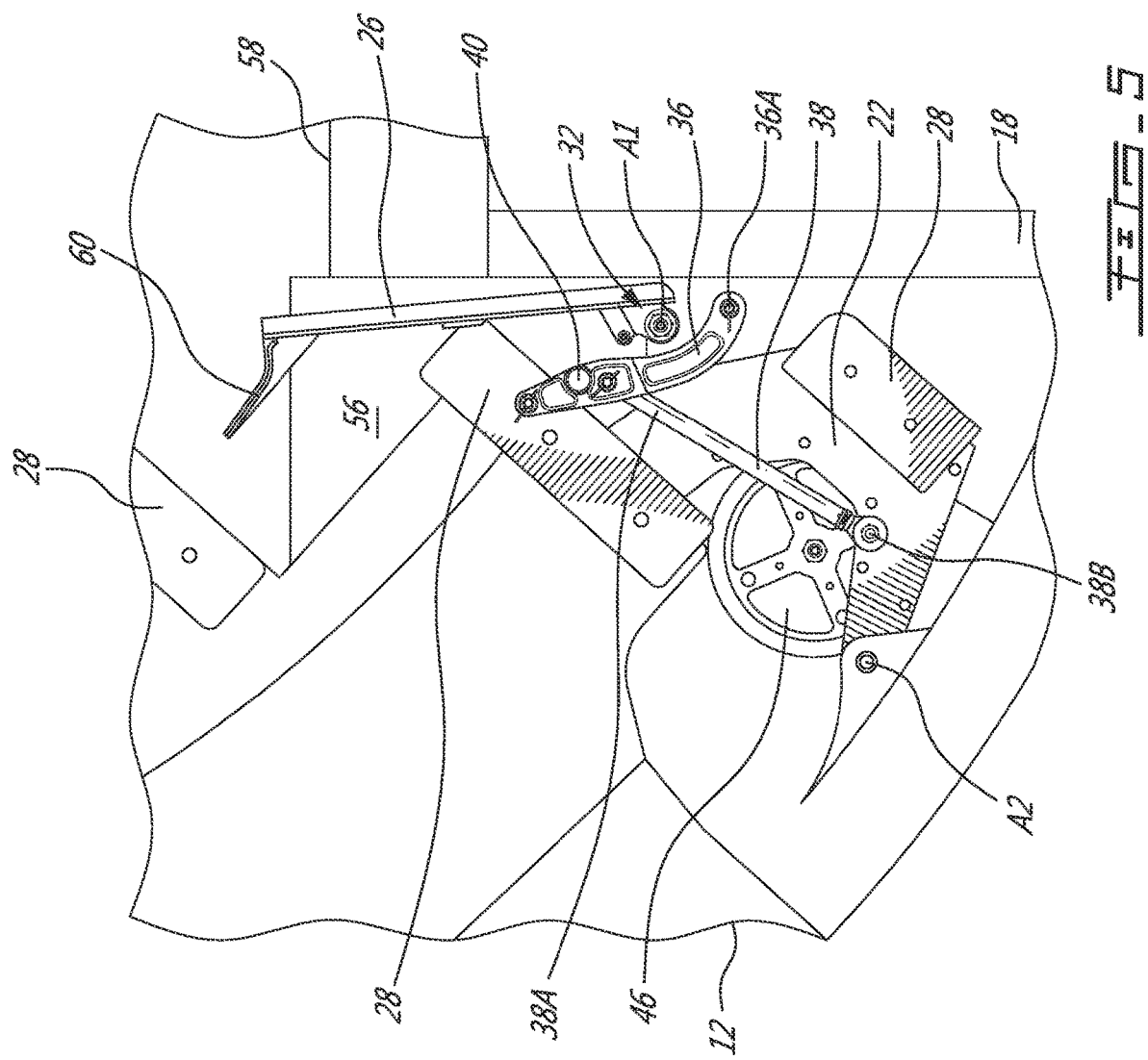
FIG. 5 is a side view of the upper portion of the airstair showing the deployable upper step in the stowed configuration.

FIG. 5 is a side view of the upper portion of the airstair showing upper step 26 in the stowed configuration when door 12 is closed. Second engaging member 42 has been omitted from FIG. 5 to show the location of primary deployment device 32. In this configuration, upper step 26 can be in a generally upright position and held in such position by one of fixed steps 28 making contact with an underside of upper step 26. Fixed step 28 can hold upper step 26 in the stowed configuration by pushing against upper step 26 to counteract and overcome the opposite biasing torque that can be applied by primary deployment device 32.

In some embodiments, door 12 can be configured so that the opening and closing of door 12 can be initiated manually either by the flight crew from the interior of aircraft 10 or by the ground crew from the exterior of aircraft 10. In some embodiments door 12 can be coupled to an assist mechanism configured to reduce an amount of force required to manually move door 12 between its open and closed positions. In some embodiments, door 12 can be operatively coupled to one or more electric motors 46 that can facilitate the opening and/or closing of door 12 for example. Motor 46 can be mounted to fuselage 18 and drivingly coupled to door 12 via cable(s) 48 (shown in FIG. 2) and pulley(s). Door 12 can comprise other (e.g., latching, locking) mechanisms and components that have been omitted from the figures for clarity.

Figure 6:
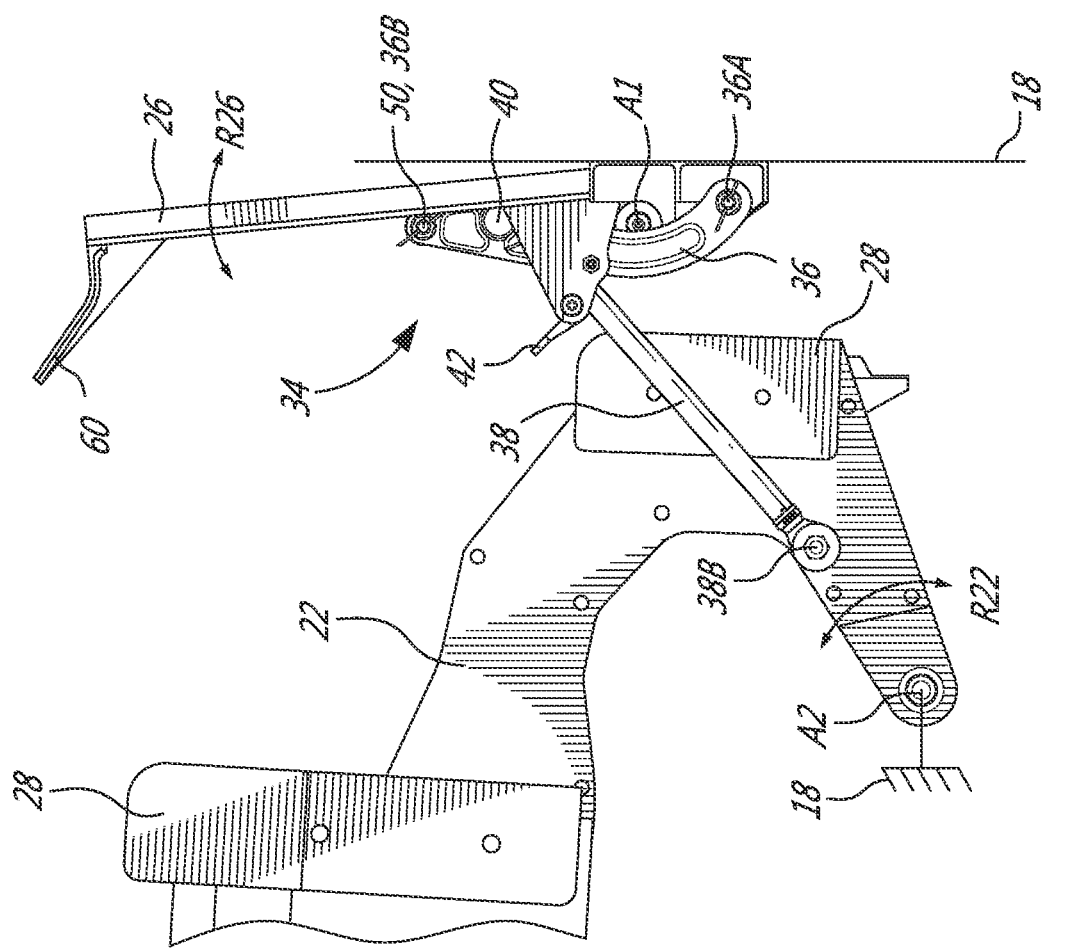
FIG. 6 is a side view of the upper portion of the airstair showing the deployable upper step in a stage where a door of the aircraft is between open and closed positions.

FIG. 6 is a side view of the upper portion of the airstair showing upper step 26 in a stage where door 12 is between the open and closed positions. The deployment and stowing of upper step 26, illustrated by rotation R26 of upper step 26 about rotation axis A1, can be coordinated with the opening and closing movement of door 12, illustrated by rotation R22 of hinge 22 about rotation axis A2. Command lever 36 of secondary deployment device 32 can comprise guide 50 disposed at second end 36B of command lever 36 opposite first end 36A of command lever 36. Guide 50 can comprise a roller or other member(s) configured for contacting an underside of upper step 26. During deployment of upper step 26, guide 50 can make contact with upper step 26 in order to oppose the deployment torque applied by primary deployment device 32 and control the deployment movement of upper step 26 based on the opening movement of door 12 transferred to guide 50 via command lever 36, link 38 and hinge 22. During stowing of upper step 26, guide 50 can make contact with upper step 26 in order to oppose the deployment torque applied by primary deployment device 32 and controllably drive (e.g., urge) upper step 26 toward its stowed configuration based on the closing movement of door 12 transferred to guide 50 via command lever 36, link 38 and hinge 22.

Figure 7:
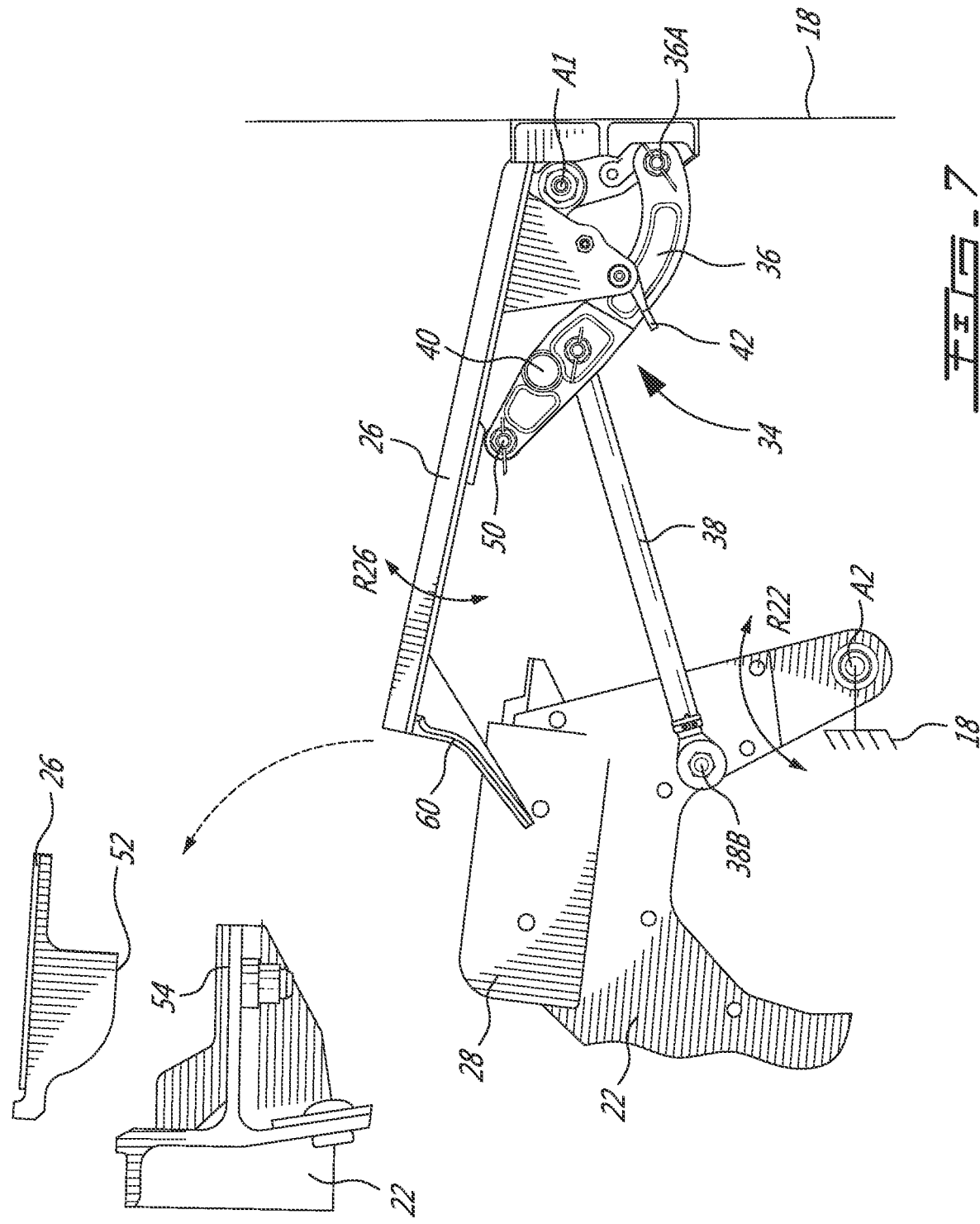
FIG. 7 is a side view of the upper portion of the airstair showing the deployable upper step in another stage where a door of the aircraft is between open and closed positions.

FIG. 7 is a side view of the upper portion of the airstair showing upper step 26 in another stage where door 12 is between the open and closed positions. FIG. 7 also shows an enlarged region where upper step 26 can interface with hinge 22 when upper step 26 is in the deployed configuration. Upper step 26 can comprise shoulder surface 52 and hinge 22 can comprise shoulder surface 54. Shoulder surfaces 52, 54 can become in contact with each other when upper step 26 is deployed so that hinge 22 can provide support and stability for upper step 26. For example, the interfacing of shoulder surfaces 52, 54 can cause load from passengers stepping on upper step 26 to be transferred into fuselage 18 via hinge 22 instead of via mechanism 34 including command lever 36 and link 38.

Figure 8:
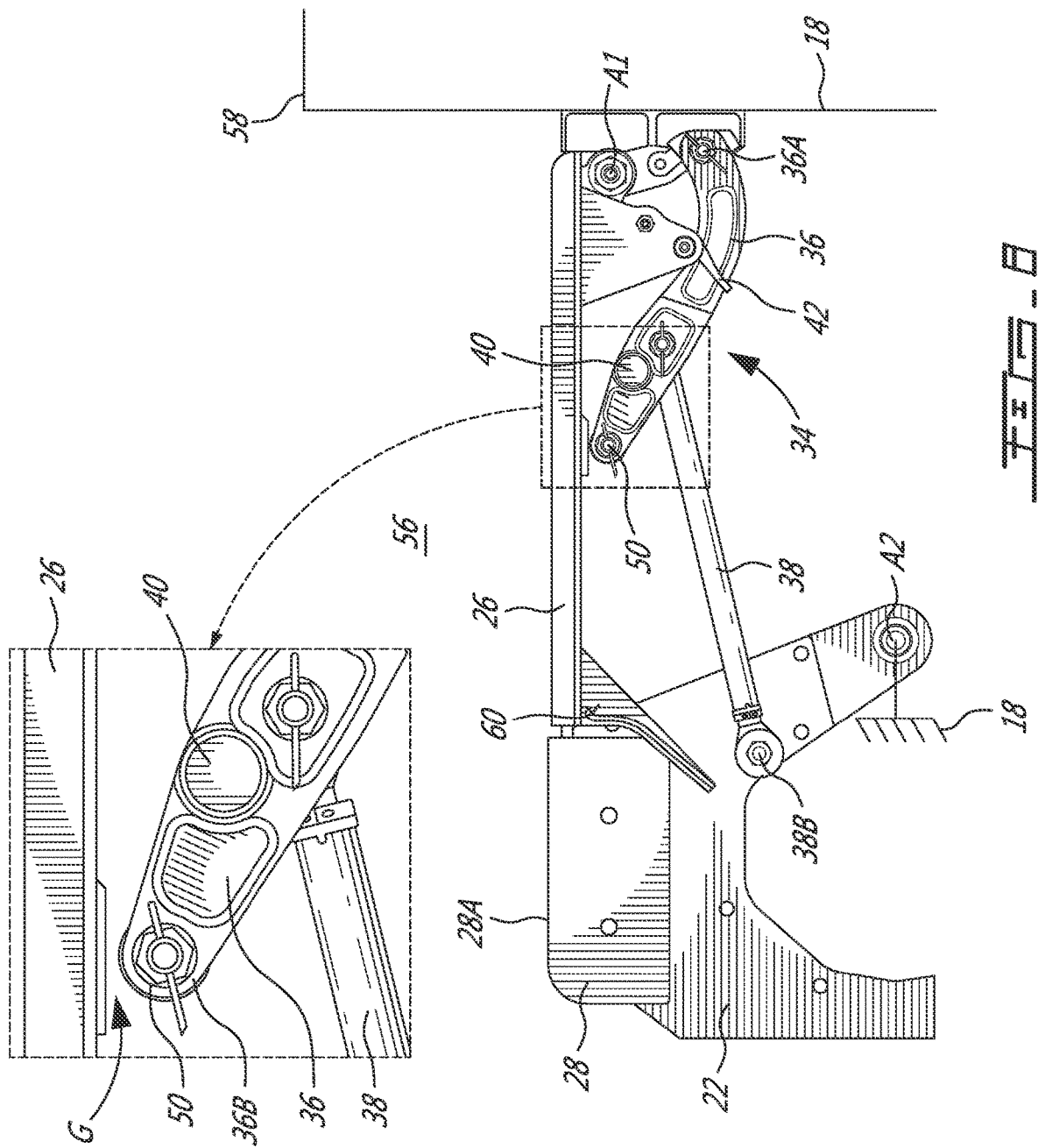
FIG. 8 is a side view of the upper portion of the airstair showing the deployable upper step in the deployed configuration.

FIG. 8 is a side view of the upper portion of the airstair showing upper step 26 in the deployed configuration. FIG. 8 includes an enlarged region showing gap G between guide 50 and upper step 26 when upper step 26 is in the deployed configuration. As explained in relation to FIG. 7 above, the interfacing of shoulder surfaces 52, 54 can provide adequate support for upper step 26 during use so that mechanism 34 including command lever 36 and link 38 does not have to provide the required support for upper step 26. Accordingly, mechanism 34 including command lever 36 and link 38 does not need to be designed to have a stiffness tailored to accommodate the load of passenger(s) stepping or standing on upper step 26. The presence of gap G can prevent or reduce the amount of passenger load that gets transferred into command lever 36 and link 38. In some embodiments, airstair system 14 can comprise a plurality of mechanisms 34 disposed along the width of upper step 26 and the presence of gap G can prevent force fight between different mechanisms 34.

In some embodiments, hinge 22 can comprise fixed step 28 that defines upper stepping surface 28A and upper step 26 can extend upper stepping surface 28A defined by hinge 22 when upper step 26 is in the deployed configuration as shown in FIG. 8. The size (area) of the upper stepping surface cooperatively defined by fixed step 28 and upper step 26 can be relatively large and can, in some embodiments, be substantially the same as an area of footwell 56 disposed at the top of airstair system 14 and below cabin floor 58.

In some embodiments, one or more side tabs 60 can be fixed to upper step 26. For example, one side tab 60 can be disposed on each lateral side of upper step 26 in order to be disposed to each lateral sides of fixed step 28 defined by hinge 22 when upper step 26 is deployed. Side tabs 60 can occlude gaps on each side of fixed step 28 in order to prevent small objects that can be dropped by passengers from being lost inside airstair system 14 via such gaps.

When upper step 26 is deployed as shown in FIG. 8, upper step 26 can be manually lifted by maintenance personnel for example to access the region of airstair system 14 that is disposed under upper step 26 for inspection, repair or service. The torque or other force provided by primary deployment device 32 (shown in FIG. 4) can be selected to be high enough to cause deployment of upper step 26 while being low enough to permit manual lifting by maintenance personnel. Manual lifting of upper step 26 can cause rotation of upper step 26 about rotation axis A1 while opposing and overcoming the torque provided by primary deployment device 32. During such manual lifting, command lever 36 and link 38 would remain in their respective positions shown in FIG. 8 in order to permit second engaging member 42 to move without engaging with first engaging member 40 of command lever 36. In some embodiments, tab 60 can serve as a handle to facilitate the manual lifting of upper step 26 by maintenance personnel.

Figure 9:
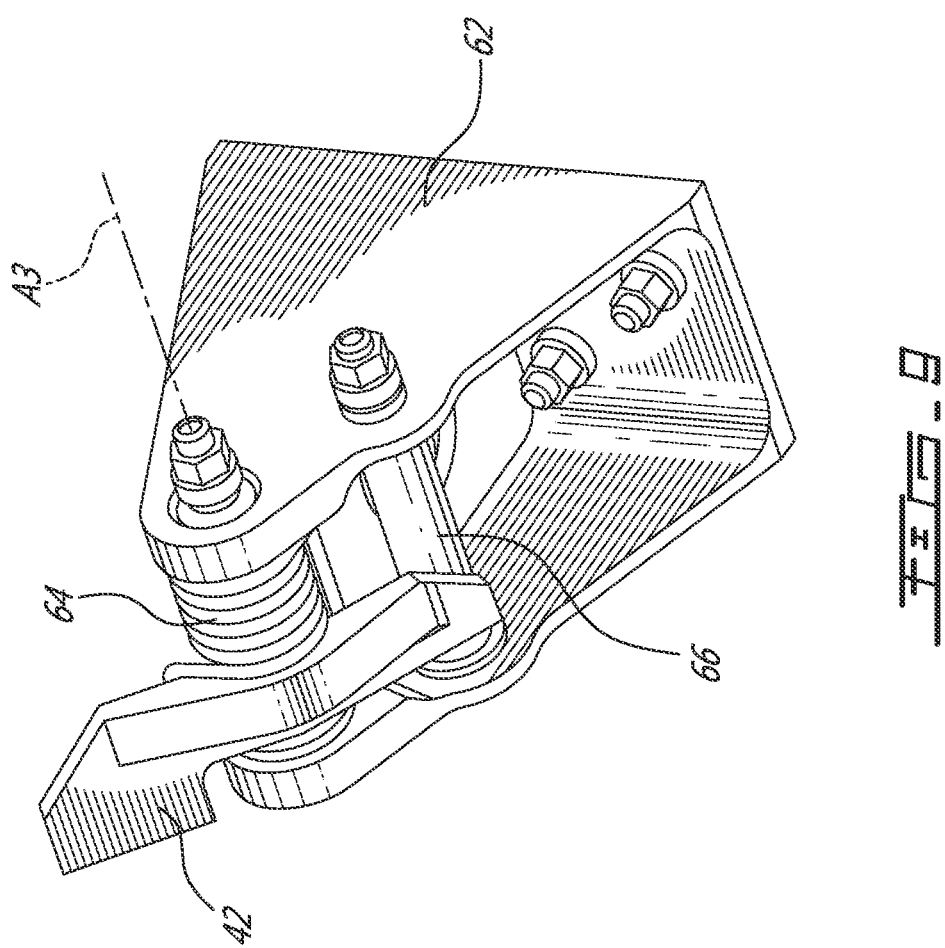
FIG. 9 is a perspective view of an engaging member of the deployable upper step.

FIG. 9 is a perspective view of second engaging member 42 of upper step 26. Second engaging member 42 can be secured (e.g., fastened) to the underside of upper step 26 via support 62. Second engaging member 42 can comprise a paddle pivotally coupled to support 62 and be rotatable about rotation axis A3. Second engaging member 62 can be movable (e.g., rotatable) between a ceding position (shown in FIG. 11C) allowing first engaging member 40 to move past second engaging member 42, and an interfering position (shown in FIGS. 9 and 10) interfering with movement of first engaging member 40. Second engaging member 42 can be resiliently biased toward the interfering position via spring 64. Spring 64 can be a torsion (e.g., coil) spring that is disposed coaxially with rotation axis A3 and that is configured to apply a torque on second engaging member 42. Second engaging member 42 can be resiliently biased against hard stop 66 which defines the interfering position of second engaging member 42.

Figure 10:
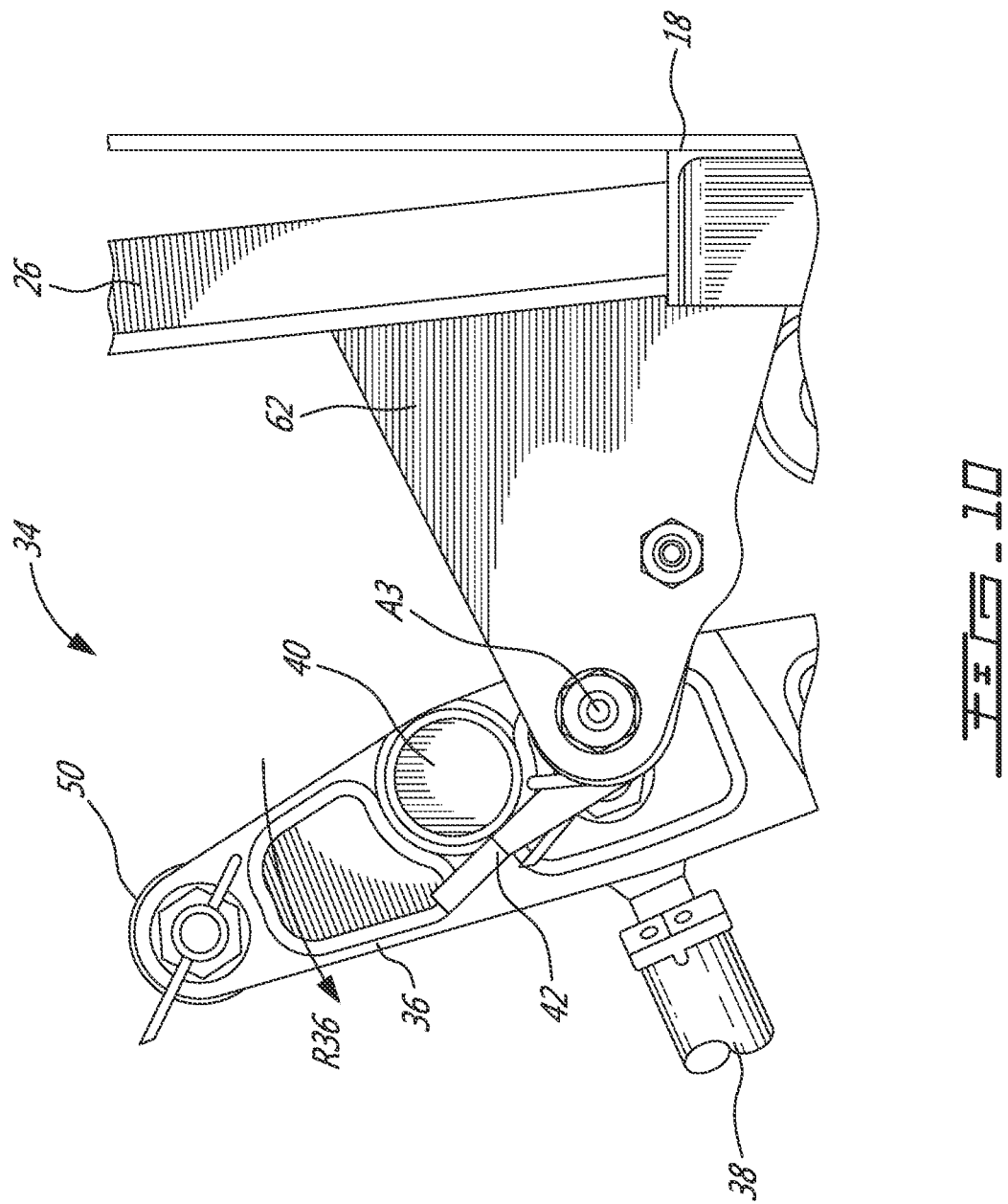
FIG. 10 is a side view showing engagement of a secondary deployment device with the upper step.

FIG. 10 is a side view showing engagement between first engaging member 40 of command lever 36 and second engaging member 42 of upper step 26. Even though primary deployment device 32 may be adequate for causing deployment of upper step 26 during opening movement of door 12, some regulations may mandate the presence of a backup (i.e., failsafe) mechanism/device that can cause the deployment of upper step 26 in the event of a failure of primary deployment device 32 especially where door 12 is also intended to be used as an emergency exit. Such failure can be any situation (e.g., spring failure/break, sticking of upper step 26 or other issue) where primary deployment device 32 would not be able to cause deployment of upper step 26 during opening of door 12. Accordingly, mechanism 34 can be configured to cause deployment of upper step 26 by pulling upper step 26 toward its deployed configuration. The pulling of upper step 26 can be coordinated with the opening movement of door 12 through the use of link 38 and command lever 36.

During normal deployment and stowing of upper step 26 when primary deployment device 32 is in proper operating order, first engaging member 40 may not become engaged with second engaging member 42 as shown in the preceding figures. However, in the event where door 12 is opening but upper step 26 does not deploy under the influence of primary deployment device 32, counter-clockwise rotation R36 of command lever 36 as shown in FIG. 10 would cause first engaging member 40 to engage with second engaging member 42 and thereby pull upper step 26 toward the deployed configuration from the stowed configuration. As shown in FIG. 7, the kinematics arrangement of mechanism 34 can be configured so that first engaging member 40 does not pull upper step 26 all the way to the deployed configuration. For example, mechanism 34 can be configured so that first engaging member 40 pulls upper step 26 only part way to the deployed configuration and then gravity acting on upper step 26 can cause upper step 26 to reach its fully deployed configuration.

FIGS. 11A-11D depict sequential steps for causing engagement of first engaging member 40 and second engaging member 42 in case where door 12 is open while upper step 26 is in the stowed configuration. This can represent a maintenance situation where upper step 26 has been lifted manually and has been left resting on guide 50 while door 12 is partially open or upper step 26 is otherwise caused to be in the stowed configuration while door 12 is not closed. In other words, in case upper step 26 is left in the stowed configuration while door is open, the next cycle of closing/opening of door 12 can cause re-engagement of mechanism 34 with upper step 26.

Figure 11A:
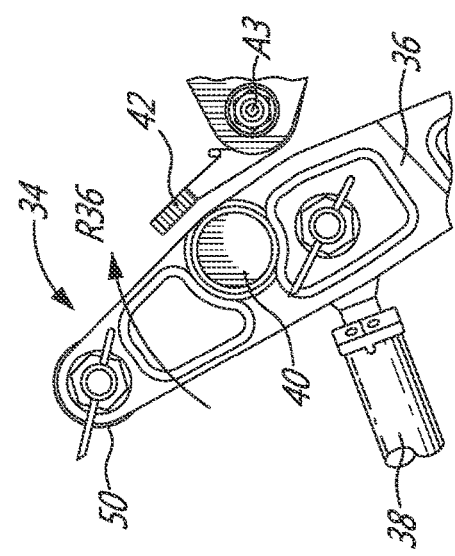
FIGS. 11A-11D are side views showing sequential steps to establish engagement of the secondary deployment device with the upper step.

FIG. 11A shows a step where command lever 36 is rotating in the clockwise direction due to the closing movement of door 12. First engaging member 40 is approaching second engaging member 42 which is in the interfering position.

Figure 11B:
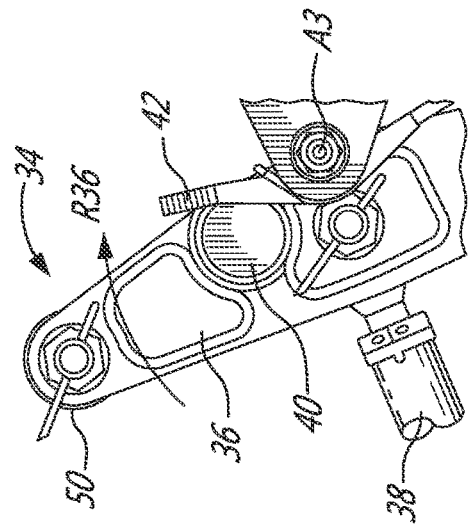

FIG. 11B shows a subsequent step where command lever 36 continues to rotate in the clockwise direction due to the closing movement of door 12. First engaging member 40 contacts and pushes second engaging member 42 away from the interfering position of FIG. 11A in order to oppose and overcome the torque applied to second engaging member 42 by spring 64 (shown in FIG. 9).

Figure 11C:
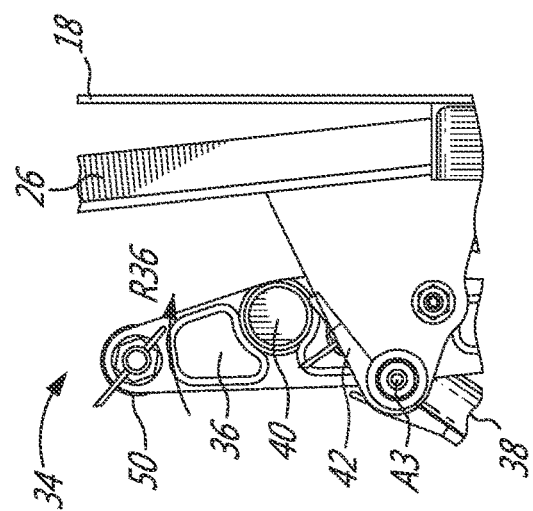

FIG. 11C shows a subsequent step where command lever 36 continues to rotate in the clockwise direction due to the closing movement of door 12. First engaging member 40 has pushed second engaging member 42 to its ceding position where first engaging member 40 is permitted to pass by second engaging member 42.

Figure 11D:
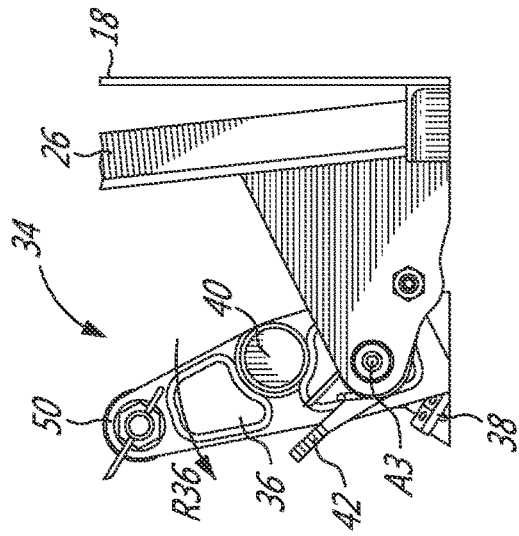

FIG. 11D shows a subsequent step where second engaging member 42 has returned to its interfering position defined by hard stop 66 (shown in FIG. 9) due to the influence of spring 64 after first engaging member 40 has moved past second engaging member 42 and has released second engaging member 42. FIG. 11D shows command lever 36 rotating in the counter-clockwise direction prior to causing engagement of first engaging member 40 with second engaging member 42 and returning to the configuration illustrated in FIG. 10.

Figure 12:
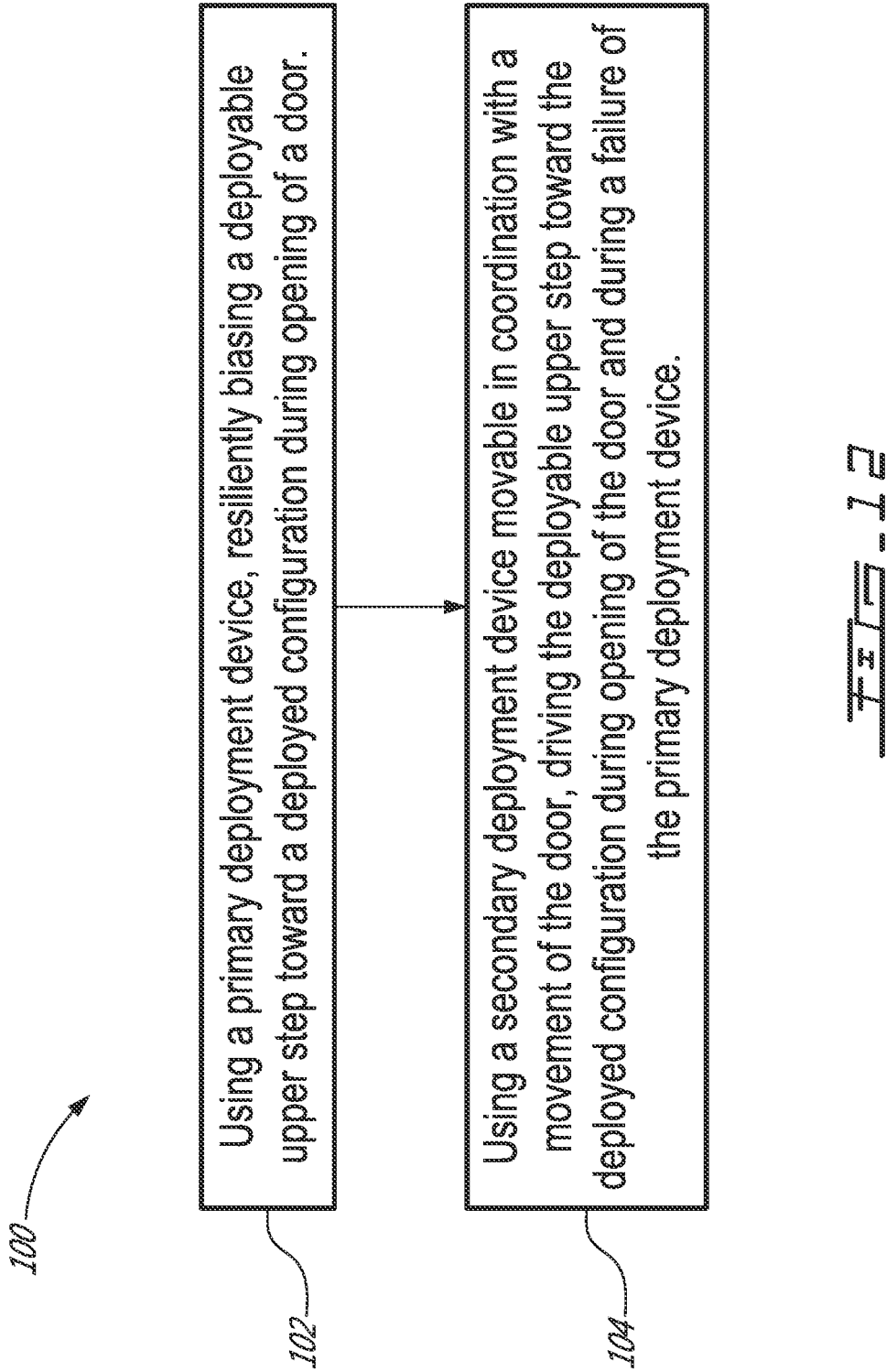
FIG. 12 is a flowchart of a method for actuating a deployable upper step of an airstair.

FIG. 12 is a flowchart of a method 100 for actuating deployable upper step 26 of an airstair. Method 100 can be conducted using airstair system 14 described herein. Method 100 can comprise:
  using primary deployment device 32, resiliently biasing upper step 26 toward the deployed configuration during opening of door 12 of aircraft 10 (see block 102); and
  using a secondary deployment device (e.g., mechanism 34) movable in coordination with the movement of door 12, driving upper step 26 toward the deployed configuration during opening of door 12 and during a failure of primary deployment device 32 (see block 104).

Upper step 26 can be pivotable about rotation axis A1 different from rotation axis A3 of door 12. Upper step 26 can be pivotally coupled to fuselage 18 of aircraft 10.

Method 100 can comprise resiliently biasing upper step 26 toward the deployed configuration irrespective of the movement and/or position of door 12.

Method 100 can comprise using secondary deployment device (e.g., mechanism 34) to drive upper step 26 toward the stowed configuration during closing of door 12.

Method 100 can comprise using secondary deployment device (e.g. mechanism 34) to pull upper step 26 toward the deployed configuration.

FIG. 13 is a flowchart of a method 200 for actuating deployable upper step 26 of an airstair. Method 200 can be conducted using airstair system 14 described herein. Method 200 can comprise:
  deploying upper step 26 of the airstair toward the deployed configuration by pivoting upper step 26 about a first pivot location, upper step 26 being pivotally coupled to fuselage 18 of aircraft 10 at the first pivot location (see block 202); and
  opening door 12 pivotally coupled to fuselage 18 at a second pivot location different from the first pivot location, door 12 having an interior side facing an interior of aircraft 10 when door 12 is closed and defining one or more other steps 28 cooperating with upper step 26 to define an airstair (see block 204).

Door can be pivotally coupled to fuselage 18 via hinge 22. Method 200 can comprise causing upper step 26 to interface with hinge 22 when upper step 26 is in the deployed configuration.

Hinge 22 can define upper stepping surface 28A. Method 200 can comprise using upper step 26 to extend upper stepping surface 28A defined by hinge 22 when upper step 26 is in the deployed configuration.

Method 200 can comprise resiliently biasing upper step 26 toward the deployed configuration irrespective of a position and/or movement of door 12.

Method 200 can comprise driving upper step 26 toward the stowed configuration during closing of the door.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for actuating a deployable upper step of an airstair of an aircraft, the method comprising:
  using a primary deployment device, resiliently biasing the deployable upper step toward a deployed configuration during opening of a door of the aircraft; and
  using a secondary deployment device movable in coordination with a movement of the door, driving the deployable upper step toward the deployed configuration during opening of the door and during a failure of the primary deployment device,
  wherein:
    the secondary deployment device comprises a command lever pivotally coupled to a fuselage of the aircraft and drivingly coupled for coordinated movement with the movement of the door;
    the secondary deployment device comprises a first engaging member;
    the deployable upper step comprises a second engaging member for engaging with the first engaging member;
    the second engaging member is movable relative to the deployable upper step between a ceding position allowing the first engaging member to move past the second engaging member, and an interfering position interfering with movement of the first engaging member; and the second engaging member is resiliently biased toward the interfering position.

2. The method as defined in claim 1, comprising resiliently biasing the deployable upper step toward the deployed configuration irrespective of the movement of the door.

3. The method as defined in claim 1, wherein the deployable upper step is pivotable about a rotation axis different from a rotation axis of the door.

4. The method as defined in claim 1, comprising using the secondary deployment device to drive the deployable upper step toward a stowed configuration during closing of the door.

5. The method as defined in claim 1, wherein the deployable upper step is pivotally coupled to a fuselage of the aircraft.

6. The method as defined in claim 1, comprising using the secondary deployment device to pull the deployable upper step toward the deployed configuration.

\* \* \* \* \*